3,303,150
WAX POLYMER COMPOSITIONS COMPRISING PETROLEUM WAX, POLYETHYLENE AND A COPOLYMER OF ETHYLENE AND AT LEAST ONE $C_3$–$C_8$ OLEFIN
Cyril B. Coenen and Harry F. Richards, Concord, Calif., assignors to Shell Oil Company, New York, N.Y., a corporation of Delaware
No Drawing. Filed Apr. 17, 1962, Ser. No. 188,254
3 Claims. (Cl. 260—28.5)

This invention relates to improved wax compositions. More particularly, it is concerned with the wax compositions especially suitable for coating, molding, extrusion, foaming and film forming purposes.

Petroleum-derived waxes have been used for many years to coat paper and carton boards especially for use in wrapping and containing dairy products and other foods such as bakery goods and the like as well as for coating cloth, fibers, and food products including cheese and meat to render them moisture vapor resistant. Such waxes, however, tend to crack and peel off the coated article because of their inherent short-comings. Even those modified with polyethylene, while having certain improved properties, show disadvantages relative to brittleness and lack of tensile strength under low temperature conditions and particularly when being extruded.

The addition of normal solid polyethylenes to wax in substantial quantities results in a composition having a moderately good yield strength but no tensile strength at break whatsoever and completely lacking in the ability to elongate under stress. Such compositions break when subjected to stress and hence have extremely limited utility.

These properties such as yield, tensile at break and elongation are reflected in the properties of compositions especially at low temperatures such as are encountered in the storage of dairy products and the like. Substantial improvements have been made by the utilization of certain copolymers typified by ethylene-propylene copolymers having a high ethylene content. While these are remarkably advantageous in many respects, especially with respect to tensile strength and elongation when utilized in substantial proportions in wax, there is a certain degree of improvement to be desired in yield stress.

It is an object of this invention to improve wax compositions. It is a particular object of the invention to provide improved wax compositions containing substantial proportions of hydrocarbon polymers. It is a special object of the invention to provide wax-polymer compositions having an improved combination of properties reflected in the yield strength, tensile strength at break and elongation thereof. Other objects will become apparent during the following description of the invention.

Now, in accordance with the present invention, it has been found that such improved wax compositions comprise 15–85% by weight of petroleum hydrocarbon wax and 15–85% by weight of a mixture of ethylene or propylene homopolymers and a hydrocarbon polymer having a general configuration:

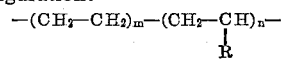

wherein the ethylene units $m$ consitiute 80–95 mol percent of the units $m+n$ employed in preparing the polymer and R is a hydrocarbyl radical, the weight/ratio of polyethylene (or polypropylene) to the special polymer defined above being between about 2:1 and about 1:5.

More particularly, compositions according to the present invention having unexpectedly improved combinations of properties comprise 50–85% by weight of petroleum hydrocarbon wax, 15–20% by weight of a mixture of polyethylene and a copolymer of ethylene with at least one $C_{3-18}$ olefin, the copolymer comprising 80–95 mol percent of ethylene units and having an intrinsic viscosity of 0.3–6.0, the weight ratio of polyethylene to the copolymer being between about 2:1 and 1:5.

Still more particularly, the present invention in its preferred aspects comprises a composition containing 65–80% by weight of petroleum hydrocarbon wax and 20–35% by weight of a mixture of polyethylene and a copolymer of ethylene and propylene, the copolymer comprising 80–95 mol percent ethylene, the weight ratio of polyethylene to copolymer being between about 2:1 and 1:5. Still more preferably, the copolymer comprises 85–95 mol percent of ethylene and the weight ratio of polyethylene to copolymer is between about 1:1 and 1:3.

The discovery made according to the present invention is the unexpected maintenance of the excellent elongation experienced with compositions of wax and the defined classes of copolymers even though part of the copolymer is replaced with polyethylene or polypropylene. This is especially unexpected in that compositions having a substantial proportion (e.g., 30%) of polyethylene or polypropylene in paraffin wax are extremely brittle and show no tensile strength and break at the yield point, thus having no ability to elongate. As long as the proportion of polyethylene or polypropylene to copolymer is maintained within the proportions defined hereinabove, the unexpected ability to elongate is preserved while at the same time the yield strength of the composition is substantially improved over that experienced with compositions of wax and subject classes of copolymers in the absence of homopolymeric ethylene or propylene.

It should be emphasized that for many purposes compositions of petroleum waxes with homopolymers of ethylene or propylene are essentially useless. They show a high yield point but are so brittle that they have no tensile strength and cannot elongate. Consequently, the present invention can be regarded as compositions which make the use of substantial proportions of homopolymeric ethylene or propylene in wax operable on the one hand and on the other, it can be regarded as improving the yield characteristics of wax compositions containing substantial proportions of the subject copolymers.

The physical characteristics can be predetermined by the ratio of homopolymer to copolymer present in the wax composition. Thus, the tensile strength and elongation are improved to a greater degree by compositions containing between 1:1 and 1:3 weight ratio of homopolymer to copolymer, whereas the yield characteristics of the compositions are more greatly improved by increasing the ratio of homopolymer to copolymer. If ratios outside of the range being claimed are employed, the effectiveness of the invention substantially disappears. For example, if too high a proportion of homopolymer is present the disadvantages of brittle compositions appear.

The polymers utilized in the compositions in this invention are preferably prepared by copolymerizing a mixture of ethylene and a higher alpha alkene, preferably having from 3–8 carbon atoms per molecule. The most effective alpha olefins for this purpose are propylene and butene-1, although higher alkenes such as octene-1 or octadecene-1 may be utilized in place of or in addition to the lower alpha olefins.

While the process of forming the copolymers does not form a part of the present invention, the copolymers may be prepared by well known procedures, such as catalytic polymerization.

Catalytic systems which may be used include combinations of aluminum alkyl chlorides such as aluminum diethyl monochloride with trialkyl vanadates, exemplified by tri-isopropyl vanadate, or "ethyl aluminum sesquichloride" (Al) $(C_2H_5)_{3/2}$ $Cl_{3/2}$. Other vanadates include tri-secondary butyl vanadate or mixed isopropyl secondary butyl vanadates.

The most desirable catalysts are vanadium esters having the general formula VO(OR)$_3$ wherein R represents a lower hydrocarbyl radical preferably having less than about 8 carbon atoms each and still more preferably 1–4 carbon atoms each. Specific catalysts for this purpose include the ethyl, isopropyl, secondary butyl or tertiary butyl esters. These are combined with the co-catalysts aluminum dialkyl choride or the corresponding sesquichloride. Preferably, the co-catalysts are employed in ratios of aluminum to vanadium of 3 to 1 to about 20 to 1 mols.

The copolymerization is normally conducted in an inert solvent such as heptane cyclohexane or other alkane or in an inert aromatic hydrocarbon such as a benzene or toluene at temperatures between about 25° and about 60° C., the pressure varying from about atmospheric to about 55 p.s.i.g. Under these conditions the intrinsic viscosity (determined in decalin at 150° C.) usually varied from about 1 to about 6, the molecular weight of osmometry varying from about 5000 to 100,000 to about 700,000 and molecular weight as determined by light scattering methods being essentially within these numerical limits.

Polymers having the general formula

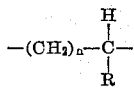

may be prepared by other means, such as polymerization of unsubstituted diolefins, such as butadiene or alkyl-substituted diolefins, such as isoprene, and hydrogenation of the copolymer to eliminate at least part of remaining unsaturated linkages. Such hydrogenated copolymers may in fact contain up to about 10% of unsaturated linkages without substantial deterioration in the properties of the copolymers for the present use. Of course, it is necessary that the polymers have a branched chain configuration meeting the requirements previously described. For example, a partially hydrogenated polybutadiene is suitable as long as the proportion of 1,2 linkages is sufficient to provide the required degree of branching.

The intrinsic viscosity of the copolymers is preferably between about 0.3 and 6.0, still more preferably between about 0.5 and 3.0, the useful polyethylene being within this same general intrinsic viscosity range. Hydrocarbyls other than alkyls are obtained by the use of styrene or alkylated styrenes in place of $C_{3-20}$ aliphatic olefins.

The density of the copolymers may be varied over a considerable range usually between about 0.85 to about 1.0, low density copolymers being regarded as those haing densities in the order of 0.85 to about 0.91 and high density materials being regarded as those having densities from the latter upper limit to about 1.0. Advantages are gained by the combination of several different degrees of high and low density and/or high and low molecular weight insofar as increase in low temperature properties without a corresponding increase in brittleness being experienced.

The precise mol ratio of ethylene to higher alkene will depend in a large part upon the exact type of wax being modified with the copolymer. It is necessary to coordinate the unbranched chain length of the polymer employed. The degree of branching in the copolymer is established by the mol ratio of ethylene to higher alkene or by the use of special polymers such as branched partially hydrogenated polybutadienes. Since petroleum waxes contain a spectrum of wax species, it is desirable to have a limited spectrum of unbranched chain units in the copolymer to coordinate with the several wax species present in the normal petroleum wax. An example of such a wax spectrum is to be found in the figures of Arabian patent, U.S. 2,915,447 and in Table II of said patent. Therein it will be seen that a paraffin wax having an average melting point of 123° F. contains about 86 mol percent of normal paraffins having from 22 to 27 carbon atoms per molecule. On the other hand, a paraffin wax having an average melting point of about 139° F. contains about 72 mol percent of waxes having from 26 to 31 carbon atoms per molecule.

The homopolymeric polyethylene or polypropylene may be prepared by any known procedure and may constitute either "high density" or "low density" polyethylenes or polypropylenes, these terms having been generally defined hereinbefore.

The waxes which may be modified with the subject copolymers are petroleum waxes referred to in the art as paraffin wax or as microcrystalline wax. Microcrystalline wax is also known as amorphous wax and is obtained by the dewaxing of residual lubricating oils while the paraffin waxes are usually obtained by the dewaxing of distillate lubricating oil fractions. Distillate paraffin waxes usually have melting points between about 120° F. and about 145° F., preferably between about 125 and 140° F. Microcrystalline waxes which contain only minor amounts of normal paraffins and largely predominate in highly branched and naphthenic waxes have melting points in the order of 130–160° F., usually between 140 and 150° F.

Two higher melting point paraffin waxes are expecially useful in many coating wax compositions; heavy distillate waxes obtained from the highest boiling distillate lubricating oil fractions by dewaxing have melting points in the order of 145 and 185° F., as does the high melting point paraffin wax split from microcrystalline wax by fractional crystallization.

Special waxes may be obtained in particular instances, such as the plastic wax obtained by the deoiling of soft wax fractions which normally are separated from paraffin waxes during deoiling and dewaxing procedures. These plastic waxes are useful for their extreme flexibility and, while useful for this particular property, are expecially subject to being fortified with respect to blocking and tensile strength as well as toughness by incorporation with the subject copolymers.

It is normal experience in designing wax coating compositions to find it necessary to combine several waxes together in a single composition. The purpose of this, of course, is to obtain the beneficial properties inherent in each particular type of wax or to minimize adverse properties of other waxes so included.

Copolymers of the invention may be dispersed in wax simply by heating and stirring the several components until a single phase melt is obtained. They may be coated on any surface such as carton board, paper, cloth, cellophane, polyethylene, or other surface where moisture proofing and vapor impermeability is desirable in addition to the coextensive properties such as extreme flexibility and yield strength.

Another method of dispersing the copolymer in wax comprises forming a solution of the copolymer in a relatively volatile solvent, such as heptane, benzene (or a chlorinated hydrocarbon solvent), and adding molten wax or a solution of wax thereto. The mixture is then cooled and the solvent removed by evaporation, vacuum flashing or steam stripping. This method produces reasonably homogeneous compositions and does not subject the components to the adverse effect of heat which may occur in the hot melt procedure referred to hereinafter.

Another method of compounding the compositions of this invention may be referred to as "mill mixing." In this method, the copolymer is heated on a compounding mill or a set of rolls and the wax is added while the copolymer is being milled. The temperature is gradually lowered to obtain an essentially solid composition when the temperature is sufficiently reduced. An improvement on this comprises the so called "extrusion mixing" of compositions prepared by any of the above methods whereby the composition is subjected to extrusion pressures which cause greater inter-mixing than can be obtained by any of the methods just described.

The compositions of this invention are useful not only in film or extrusion coating compositions, for dairy carton boards, paper, metal and the like but also may be employed for wax polish compositions (either solution or emulsion form), in printing inks, films and molded articles where high temperature is not critical. Particular uses include freezer accessories, fruit baskets, foams, disposable containers of various types, and toys, as well as wood and cardboard coatings. Likewise, the compositions are useful in the preparation of adhesives for plywood or for paperboards.

The following example illustrates the properties to be obtained in accordance with the compositions for this invention.

*Example*

Blends were prepared containing a total of 30% by weight of various polymers with 70% by weight of a paraffin petroleum hydrocarbon wax having a melting point of about 85° C. Table I outlines the data obtained with respect to tensile strength, elongation, and hardness obtained upon these samples.

We claim as our invention:

1. A composition of matter comprising 50–85% by weight of a petroleum hydrocarbon wax, and 15–50% by weight of a mixture of polyethylene (A) and a hydrocarbon copolymerization product (B) of ethylene and at least one 3–8 olefin, the copolymeric product comprising 80–95 mol percent of ethylene units and having an intrinsic viscosity of 0.3–6.0, the weight ratio of A:B being between about 2:1 and about 1:5.

2. A composition of matter comprising 65–80% by weight of a petroleum hydrocarbon wax and 20–35% by weight of a mixture of polyethylene (A) and a copolymer of ethylene and propylene (B) the copolymer comprising 80–95 mol percent ethylene, the weight ratio of A:B being between about 2:1 and about 1:5.

3. A composition of matter comprising 65–80% by weight of a petroleum hydrocarbon wax and 20–35% by weight of a mixture of polyethylene (A) and a copolymer of ethylene and propylene (B) the copolymer comprising 85–93 mol percent ethylene, the weight ratio of A:B being between about 1:1 and about 1:3.

TABLE I

| Composition [3] | Yield Stress (p.s.i.) | Tensile Stress (p.s.i.) | Elongation (percent) | Hardness (Shore D) |
|---|---|---|---|---|
| 100% High density polyethylene | 3,410 | 1,920 | 214 | |
| 30% High density polyethylene in Paraffin wax, 85° C. M.P | 1,560 | [1] | <5 | 52 |
| 25% High density polyethylene and 5% ethylene-propylene copolymer in Paraffin wax, 85° C. M.P | [2] | [2] | [2] | [2] |
| 20% High density polyethylene and 10% ethylene-propylene copolymer in Paraffin wax, 85° C. M.P | 1,511 | 750 | 52 | 47 |
| 15% High density polyethylene and 15% ethylene-propylene copolymer in Paraffin wax, 85° C. M.P | 1,260 | 797 | 544 | 46 |
| 10% High density polyethylene and 20% ethylene-propylene copolymer in Paraffin wax, 85° C. M.P | 1,102 | 1,126 | 832 | 45 |
| 5% High density polyethylene and 25% ethylene-propylene copolymer in Paraffin wax, 85° C. M.P | 874 | 1,310 | 822 | 42 |
| 30% Ethylene-propylene copolymer in Paraffin wax, 85° C. M.P | 705 | 1,710 | 810 | 40 |
| 100% Low density polyethylene | 977 | 1,805 | 560 | |
| 30% Low density polyethylene in Paraffin wax, 85° C. M.P | 1,400 | [1] | <5 | 51 |
| 20% Low density polyethylene and 10% ethylene-propylene copolymer in Paraffin wax, 85° C. M.P | 1,173 | 738 | 110 | 46 |
| 10% Low density polyethylene and 20% ethylene-propylene copolymer in Paraffin wax, 85° C. M.P | 956 | 1,202 | 804 | 43 |
| 30% Low density polyethylene in Paraffin wax, 85° C. M.P | 1,361 | [1] | <5 | 51 |
| 10% High density polyethylene and 20% ELvax 250 in Paraffin wax, 85° C. M.P | 995 | [1] [3] | <5 | 47 |
| 20% High density polyethylene and 10% ELvax 250 in Paraffin wax, 85° C. M.P | 128 | [1] | <5 | 49 |

NOTES FOR TABLE I

[1] Specimens broke at yield.
[2] Not determined.
[3] Ethylene-propylene copolymer contained 88% ethylene and had an intrinsic viscosity of 2.
1. Intrinsic viscosity is the limiting reduced viscosity as the concentration approaches zero $(\eta - \eta_0/\eta_0 C) C \to 0$
where:
$\eta$ = viscosity of blend in centistokes
$\eta_0$ = viscosity of solvent
C = concentration of solute in grams/deciliter
$\eta - \eta_0/\eta_0$ = specific viscosity ($\eta$Sp)
$\eta$sp/C = reduced viscosity ($\eta$red).
The intrinsic viscosity is the value obtained by extrapolating, to zero concentration, a series of reduced viscosities obtained for solutions of different concentrations.
2. Yield strength, tensile strength, and percent elongations were obtained on an Instron Machine using standard ASTM Method D638-52T procedure with 2.0 in./min. crosshead speed separation rate and thin film D-die-cut specimens. Thin film D-die specimens (small cross section areas) are necessary because of the large elongations experienced with samples.
3. Hardness test—Shore "A" hardness obtained using standard ASTM D676-49T test.

References Cited by the Examiner

UNITED STATES PATENTS

| | | | |
|---|---|---|---|
| 2,582,037 | 1/1952 | Hyde | 260—28.5 |
| 2,691,647 | 10/1954 | Field et al. | 260—88.1 |
| 2,728,735 | 12/1955 | Anderson | 260—28.5 |
| 2,773,053 | 12/1956 | Field et al. | 260—94.9 |
| 3,210,305 | 10/1965 | Coenen et al. | 260—28.5 |

FOREIGN PATENTS 620,375  5/1961  Canada.

MORRIS LIEBMAN, *Primary Examiner.*

J. W. BEHRMGER, J. A. GAZEWOOD,
*Assistant Examiners.*